3,000,841
COMPOSITION AND METHOD FOR INCORPORATING POWDERED MATERIAL IN RUBBER AND PLASTIC COMPOSITIONS
John Ware, 72 Myrtle Ave., Westport, Conn.
No Drawing. Filed July 1, 1958, Ser. No. 745,820
9 Claims. (Cl. 260—23)

This invention relates to the dispersion in rubber compositions which are mixed at relatively low temperatures of powdered solid additives which influence the curing and other properties of the rubber composition. The invention relates more particularly to compositions for use in affecting the dispersion of powdered materials of the kind referred to in rubber compositions during mixing at relatively low temperatures.

In the compounding of rubber compositions it is desirable to incorporate modifying ingredients at temperatures below 150° F. in the form of powdered material which serve to vulcanize or otherwise modify the composition when the composition later is subjected to higher temperatures for effecting vulcanization. Prior to vulcanization it is desirable to obtain as uniform and thorough distribution as possible of the powdered material with a minimum of reaction such as occurs if the composition prematurely becomes heated to a temperature substantially above 150° F. The introduction of powdered materials so as to obtain uniform distribution is a matter that has occasioned considerable difficulty. If attempt is merely made to continue the mixing of the rubber composition the work performed on the composition tends to occasion development of heat which is undesirable prior to the curing step, the amount of heat becoming excessive prior to adequate distribution of the powdered additive.

In order to overcome difficulties of the kind above mentioned, it has been proposed to incorporate the powdered additive with a portion of the rubber stock, but this expedient results in the production of a mix which is considerably stiffer than the balance of the rubber stock, with the result that the stiff mix that is added is difficult to blend with the balance of the stock.

One of the practices which is currently resorted to for the incorporation of powdered material into a rubber composition while it is being mixed at low temperature is that of mixing the powdered material with some liquid material which is to be blended with the rubber stock. The liquid vehicles that have been used for this purpose heretofore have resulted in the formation of a paste which is sticky at ordinary temperatures. While the paste may be blended satisfactorily with the rubber composition while it is undergoing mixing, the paste being of a consistency somewhat similar to molasses is very difficult to handle. The difficulty in handling pertains particularly to the weighing of the desired amount of paste for addition to the rubber composition. The paste tends to stick to the containers and other instruments used in handling it, with the result that the initial weighing is difficult and the matter of assuring the proper amount of paste ultimately reaching the rubber composition is a matter of even greater difficulty. Moreover, the paste tends to stick to the machinery parts, thus requiring cleaning of the machinery from time to time, which is a time-consuming and troublesome operation. Moreover, there is waste of relatively costly material and, as aforesaid, inaccuracy in compounding.

An object of this invention to overcome the difficulties and disadvantages of the character hereinabove mentioned that have been encountered in the incorporation of powdered additive materials with rubber compositions.

Further objects and advantages of this invention are the provision of a composition which is readily handled and which may be accurately weighed and which blends readily with rubber composition when undergoing mixing or milling at a temperature which does not exceed about 150° F. or, more generally, at temperatures ranging from about 90° F. to about 150° F.

According to this invention, dry powdered additives such as vulcanizing agents, anti-oxidants and accelerators are produced in the form of a dispersion in a vehicle which, in combination with the powdered additive material, provides a composition that is solid at room temperature of the order of 77° F. and which when warmed to somewhat higher temperature not greater than about 150° F. becomes liquid and easily workable. The vehicle that is employed may include a plasticizer for the rubber composition or some other ingredient of the rubber composition which serves the purposes aforesaid either alone or in combination with one or more other ingredients.

According to certain embodiments of this invention, the composition of my invention may employ liquid chemical additives which are normally avoided because of the nuisance of handling them at the factory because of their liquid or sticky consistency.

The composition of the vehicle which is used in the practice of my invention may be widely varied inasmuch as it is the physical property or characteristics of the vehicle rather than its chemical nature that is availed of in the practice of this invention. The vehicle which is employed should, of course, be consistent with the properties desired in the finished composition and any materials which are incompatible or impart undesired properties in the finished composition should be avoided or reduced to a minimum. However, most rubber composition includes additives in the nature of plasticizers, paraffinic additions, resinous additions and the like and by selection of such additives one is enabled to provide vehicles which have the property of being solid at normal temperature but becoming liquid or at least very readily workable at temperatures between 90° F. and 150° F. When reference is made to the vehicle or to the dispersion composition as being "solid," this term is used as indicating that the vehicle or composition is resistant to flow and can be handled in the form of discrete pieces at ordinary temperature, namely, 77° F.

The practice of my invention is illustrated by reference to the following typical examples of the practice thereof:

EXAMPLE 1

Vehicle A

| | Percent |
|---|---|
| Naphthenic hydrocarbon oil | 65 |
| Paraffin, m. pt. 130° F | 27 |
| Polyisobutylene | 8 |

The naphthenic hydrocarbon oil is a light oil commonly used as a plasticizer. One such oil that is suitable is sold under the designation Circo Light Process Oil. The polyisobutylene that is used in the foregoing formulation is of moderately stiff, rubbery consistency, that sold under the designation LMMH being suitable.

The foregoing vehicle at about 120° F., after blending of the ingredients, is in the form of a readily flowable liquid in which suitable powdered materials may be dispersed. A typical composition particularly suitable for incorporation with butyl and neoprene rubber compositions has the following composition:

| | Percent |
|---|---|
| Red Lead | 90 |
| Vehicle A | 10 |

The foregoing composition has a cheese-like consistency at 77° F. It becomes soft, readily workable at temperatures of the order of 120° F.

EXAMPLE 2

Vehicle B

| | Percent |
|---|---|
| Isobutylene polymer | 80 |
| Paraffin, m. pt. 130° F | 20 |

Isobutylene polymer as used in vehicle B is a pourable liquid at room temperature and one such material which is suitable is Polybutene 32E. A dispersion particularly suitable in the manufacture of butyl compounds is as follows:

| | Percent |
|---|---|
| P-quinone dioxime | 62½ |
| Vehicle B | 37½ |

P-quinone dioxime serves as a vulcanizing agent particularly suitable for butyl rubber, one such product being sold under the trademark GMF.

EXAMPLE 3

Vehicle C

| | Percent |
|---|---|
| Resinous condensation product derived from dimethyl naphthalene | 40 |
| Paraffin, m. pt. 130° F | 20 |
| Naphthenic hydrocarbon oil | 40 |

The resin component of vehicle C is a resin which per se is solid at 77° F., a suitable resin being sold under the trademark Kemflex A. The naphthenic hydrocarbon oil is the same as that referred to hereinabove in connection with vehicle A. A suitable dispersion having particular utility in connection with neoprene compounds has the following composition:

| | Percent |
|---|---|
| 2-mercapto-Imidazoline | 70 |
| Vehicle C | 30 |

The 2-mercapto-imidazoline serves primarily as a vulcanizing agent having particular utility for use in neoprene compounds and one such material is sold under the trade name NA 22.

EXAMPLE 4

Vehicle D

| | Percent |
|---|---|
| Polyalkylpolyphenol | 66⅔ |
| Stearic acid | 33⅓ |

The polyalkylpolyphenol is employed in the form of a viscous liquid and serves as an anti-oxidant in the finished rubber composition. This example illustrates the introduction of a liquid vehicle which otherwise is difficult to incorporate. Moreover, the vehicle of this example does not employ a material functioning as a plasticizer, some formulations requiring that no plasticizer be used. A suitable dispersion according to my invention using vehicle D has the following composition:

| | Percent |
|---|---|
| Zinc oxide | 70 |
| Vehicle D | 30 |

EXAMPLE 5

Vehicle E

| | Percent |
|---|---|
| Coumar resin | 60 |
| Blend of petroleum waxes | 30 |
| Low molecular wgt. polyethylene | 10 |

This coumar resin is viscous at normal temperatures, a suitable grade being that designated as P25. A suitable blend of petroleum waxes is sold under the trademark Heliozone, which is said to impart protection from sunlight. The polyethylene is normally solid but of low molecular weight for a solid polyethylene. Without the polyethylene addition the vehicle is sticky notwithstanding that it is solid at room temperatures. The polyethylene minimizes stickiness and permits the vehicle to be used in a composition that can be readily sub-divided for weighing and incorporation of rubber compositions. A suitable composition embodying my invention is as follows:

| | Percent |
|---|---|
| Dipenta methylene-thiuram-tetrasulfide | 66⅔ |
| Vehicle E | 33⅓ |

The dipenta methylene-thiuram-tetrasulfide serves primarily as an accelerator and one such product is sold under the trademark Tetrone A.

EXAMPLE 6

Vehicle F

| | Percent |
|---|---|
| Alkylated thiourea | 70 |
| Paraffin, m. pt. 130° F | 25 |
| Isobutylene polymer | 5 |

The alkylated thiourea is a liquid which functions primarily as an accelerator and heretofore difficulty has been encountered in weighing this material and introducing it with accuracy into the rubber composition. By utilizing this liquid material as part of the vehicle this difficulty is overcome. The isobutylene polymer may be that described hereinabove in connection with Example 2. A suitable composition providing a desirable ratio of accelerator and zinc oxide is as follows:

| | Percent |
|---|---|
| Zinc oxide | 70 |
| Vehicle F | 30 |

The compositions of the foregoing examples have moderately stiff, cheese-like consistency at 77° F., but the softening points of the respective compositions are too low to permit extrusion or flaking.

EXAMPLE 7

A vehicle having somewhat higher softening point which nevertheless is somewhat under 150° F. is as follows:

Vehicle G

| | Percent |
|---|---|
| Paraffin, m. pt. 130° F | 40 |
| Low molecular wgt. polyethylene | 40 |
| Isobutylene polymer | 20 |

The low molecular weight polyethylene and the isobutylene polymer preferably are those described hereinabove in connection with Examples 2 and 5. The dispersion according to my invention has the following composition:

| | Percent |
|---|---|
| 2-mercapto-imidazoline | 45 |
| Diortho-tolylguanidine salt of dicatechol borate | 22½ |
| Vehicle G | 32½ |

A suitable diortho-tolylguanidine salt of dicatechol borate is sold under the trademark Permalux.

In formulating the compositions according to this invention the usual procedure is to warm the vehicle ingredients to a temperature at which they are softened or melted and can be readily blended by agitation. The dry ingredient, such as any one or more of the curing agents red lead, p-quinone dioxime, 2-mercapto-imidazoline, dipenta methylene-thiuram-tetrasulfide or diorthotolylguanidine salt of dicatechol borate, is then incorporated, the initial mix having a rather thick consistency. The pre-mix thus made is then subjected to a grinding action ordinarily at a moderate temperature. Thus in connection with Examples 1 to 6 the grinding action may be carried out at a temperature of the order of 120° F. while the composition of Example 7 may be subjected to grinding at a somewhat higher temperature of 150° F. For effecting the grinding I have found that a 3-roll ink mill, also sometimes called a paint mill, is suitable, and for obtaining especially uniform dispersion the composition may be passed through the mill twice. It is not essential to use a 3-roll mill inasmuch as other mechanical dispersing means may be employed such as a high-speed rotary agitator which is maintained in operation while the vehicle is warmed to desired temperature and during addition of the dry powder. During the grinding the composition becomes converted to a smooth paste which may be taken off into containers of suitable size and allowed to cool. At room temperature the finished product has the consistency aforesaid which permits ready subdivision into pieces that can be weighed and incorporated with a rubber composition. As noted above, the composition may be formulated as in Example 7 whereby the composition may be supplied in particulate form such as flakes.

Any of the compositions embodying this invention may be employed during mixing rubber compositions, for example when using a Banbury mixer or a 2-roll rubber mill. While the dispersions of my invention are solid at room temperature, nevertheless their melting point being below 150° F. they become softened and are readily and rapidly incorporated with the rubber composition.

While certain examples have been described hereinabove as typical of the practice of my invention, it is to be understood that this has been done merely for the purposes of illustration and that the vehicle which is used may be subject to wide variation both as regards materials employed and the relative proportions thereof. The materials employed ordinarily are selected depending on the materials to be incorporated in the finished rubber composition. However, for most purposes it is desirable to include in the vehicle at least about 20% of materials selected from the group consisting of paraffinic wax, solid polyethylene and stearic acid. In the finished dispersion the powered ingredient ordinary is of major proportion. While this invention is especially applicable to rubber compositions, the principle employed may be availed of whenever a powdered material is to be incorporated in a composition during mixing at a temperature between 90° F. and 150° F. Certain vinyl compositions may have powdered material incorporated therewith in the manner hereinabove disclosed.

I claim:

1. A preparation for use in the incorporation of a powdered material in a plastic composition during milling of said composition at a temperature within the range of about 90° to about 150° F., said preparation consisting essentially of a uniform dispersion of a powdered solid material in a vehicle composed of thermoplastic material thermo-responsive for transition of said preparation from a solid at a temperature of about 77° F. to a soft, smooth, pasty consistency at a temperature within said range of about 90° F. to about 150° F. whereby said preparation is readily dispersible in said plastic composition during milling at a temperature within said range.

2. A preparation according to claim 1 wherein said powdered material constitutes the major proportion of said preparation and wherein at least 20% of said vehicle is selected from the group consisting of paraffinic wax, polyethylene and stearic acid.

3. A preparation for use in the incorporation in a rubber composition of a first rubber additive material normally liquid at 77° F. and a second rubber additive material that is normally in solid powdered form at 77° F., said preparation comprising a uniform dispersion of said second material in a thermoplastic vehicle which comprises said first material blended with a thermoplastic material normally solid at 77° F. and which is thermo-responsive for transition of said preparation from a solid at a temperature of about 77° F. to a soft, smooth, pasty consistency at a temperature within said range of about 90° F. to about 150° F. whereby said preparation is readily dispersible in said rubber composition during milling at a temperature within said range.

4. A preparation for addition to a rubber composition during milling at a temperature within the range of about 90° to about 150° F., said preparation consisting essentially of a uniform disperson of a powdered solid material comprising a curing agent for the rubber composition in a vehicle composed of thermoplastic material thermo-responsive for transition of said preparation from a solid at a temperature of about 77° F. to a soft, smooth, pasty consistency at a temperature within said range of about 90° F. to about 150° F. whereby said preparation is readily dispersible in said rubber composition during milling at a temperature within said range.

5. A preparation according to claim 4 wherein said vehicle consists essentially of a plurality of materials adapted for compounding with the rubber composition and blended to provide thermo-responsiveness as defined in claim 4.

6. A method of incorporating a powdered rubber additive material selected from the group consisting of vulcanizing agents, anti-oxidants and accelerators in a rubber composition which comprises selecting components of the finished rubber composition that are blendable inter se to form a vehicle having a melting point within the range from about 90° F. to about 150° F., blending said components while at a temperature at least as high as substantially the melting point of said vehicle, mixing said powdered material with said vehicle while said vehicle is at a temperature at least as high as substantially said melting point, grinding said powdered material in admixture with said vehicle while said vehicle is at a temperature at least as high as substantially said melting point to form a uniform dispersion of soft, smooth, pasty consistency, cooling the resulting dispersion to a temperature below about 90° F. at which said dispersion is solid, subdividing said solid dispersion into discrete pieces, and adding said solid pieces to said rubber composition while said rubber composition is undergoing milling at a temperature in the range from about 90° F. to about 150° F.

7. A method of making a composition adapted for incorporation in a rubber composition during the milling thereof at a temperature between about 90° F. and about 150° F., which method compromises mixing a powdered rubber additive material selected from the group consisting of vulcanizing agents, anti-oxidants and accelerators with a thermoplastic vehicle that is compatible with said rubber composition and has a melting point between about 90° F. and about 150° F. while said vehicle is at a temperature at least as high as substantially the melting point of said vehicle and grinding the said powdered material admixed with said vehicle while said vehicle is at a temperature at least as high as about said melting point to form a uniform dispersion of soft, smooth, pasty consistency, and then cooling the resulting dispersion to a temperature which is below said melting point and at which said dispersion is solid.

8. A preparation for use in incorporating a powdered solid rubber additive material selected from the group consisting of vulcanizing agents, anti-oxidants and accelerators in a rubber composition during the milling of said rubber composition at a temperature between about 90° F. and about 150° F., said preparation consisting essentially of said powdered solid material uniformly dispersed in a vehicle composed of rubber-compatible thermoplastic material thermoresponsive for transition of said preparation from a solid at a temperature of about 77° F. to a soft, smooth, pasty consistency at a temperature within said range of about 90° F. to about 150° F., said powdered material being in major proportion up to about 90% of said preparation.

9. A preparation according to claim 8 which includes a plasticizer for said rubber composition.

References Cited in the file of this patent
UNITED STATES PATENTS

| | | |
|---|---|---|
| 2,598,229 | Creed | May 27, 1952 |
| 2,640,088 | Glenn et al. | May 26, 1953 |
| 2,653,925 | Olin | Sept. 29, 1953 |
| 2,840,564 | Kinstler et al. | June 24, 1958 |
| 2,850,553 | Roberts | Sept. 2, 1958 |

UNITED STATES PATENT OFFICE
CERTIFICATE OF CORRECTION

Patent No. 3,000,841 September 19, 1961

John Ware

It is hereby certified that error appears in the above numbered patent requiring correction and that the said Letters Patent should read as corrected below.

Column 1, line 14, for "affecting" read -- effecting --; column 5, line 50, for "ordinary" read -- ordinarily --; column 6, line 60, for "compromises" read -- comprises --; column 7, line 6, strike out "dispersed in a vehicle composed of rubber-compatible".

Signed and sealed this 20th day of February 1962.

(SEAL)
Attest:

ERNEST W. SWIDER
Attesting Officer

DAVID L. LADD
Commissioner of Patents